United States Patent [19]

Starcevic

[11] Patent Number: 4,922,150
[45] Date of Patent: May 1, 1990

[54] VERTICAL-AXIS ELECTRICAL MACHINE OF UMBRELLA DESIGN

[75] Inventor: Mihailo Starcevic, Mellingen, Switzerland

[73] Assignee: Asea Brown Boveri Ltd., Baden, Switzerland

[21] Appl. No.: 336,083

[22] Filed: Apr. 11, 1989

[30] Foreign Application Priority Data

Apr. 26, 1988 [CH] Switzerland .............. 1556/88

[51] Int. Cl.$^5$ ............................................ H02K 7/08
[52] U.S. Cl. ........................................ 310/90; 310/91; 310/261; 384/224; 384/905
[58] Field of Search ...................... 290/52; 310/91, 157, 310/217, 261, 268, 90; 384/9, 224, 308, 905

[56] References Cited

U.S. PATENT DOCUMENTS

| | | |
|---|---|---|
| 1,687,513 | 10/1928 | Reist . |
| 1,714,484 | 5/1929 | Johnson ............................ 310/157 |
| 2,701,171 | 2/1955 | Henter ................................ 290/52 |
| 3,806,211 | 4/1974 | Nagata et al. ....................... 380/160 |
| 4,048,528 | 9/1977 | Whitney ......................... 290/52 X |
| 4,258,280 | 3/1981 | Starcevic . |
| 4,573,810 | 3/1986 | Fust et al. . |

FOREIGN PATENT DOCUMENTS

| | | |
|---|---|---|
| 416740 | 7/1925 | Fed. Rep. of Germany . |
| 889319 | 9/1953 | Fed. Rep. of Germany . |
| 962911 | 5/1957 | Fed. Rep. of Germany . |
| 969451 | 6/1958 | Fed. Rep. of Germany . |
| 2459236 | 5/1976 | Fed. Rep. of Germany . |
| 1171936 | 2/1959 | France . |
| 1189531 | 10/1959 | France . |
| 1947043 | 3/1971 | France . |
| 2292365 | 6/1976 | France . |
| 651362 | 9/1985 | Switzerland . |

OTHER PUBLICATIONS

Wiedemann/Kellerberger, *Design of Electrical Machines*, 1967, p. 169, FIG. 56.

*Primary Examiner*—Patrick R. Salce
*Assistant Examiner*—D. L. Rebsch
*Attorney, Agent, or Firm*—Oblon, Spivak, McClelland, Maier & Neustadt

[57] ABSTRACT

The vertical-axis electrical machine of umbrella design has a disc-shaped rotor (4), the combined thrust and guide bearing (12) which is mounted at the disc underside. The bearing rests on a bearing support structure (17), which has the shape of a hollow truncated cone and is supported directly on the foundation (1). This arrangement is distinguished by low design height. Elongations of the bearing support structure (17) caused by temperature are converted without loss of stiffness and centering into axial displacement of the end of the hollow truncated cone (17) on the bearing side.

11 Claims, 2 Drawing Sheets

VERTICAL-AXIS ELECTRICAL MACHINE OF UMBRELLA DESIGN

BACKGROUND OF THE INVENTION

1. Field of the Invention

The invention relates to a vertical-axis electrical machine of umbrella design, especially a hydraulic generating set, having a stator which is mounted on a foundation or is supported in a foundation pit against the pit wall there, and an essentially disc-shaped rotor with a combined thrust and guide bearing which is mounted on a bearing support structure likewise supported on the foundation.

Such an electrical machine is known, for example, from the book by Wiedemann/Kellerberger "Konstruktion elektrischer Maschinen" ("Design of electrical machines"), Springer Verlag, Berlin-Heidelberg-New York 1967, page 169, FIG. 56.

2. Discussion of Background

Generators for driving through Kaplan turbines—less frequently for Francis turbines, sometimes also for propeller turbines—are often constructed as so-called umbrella types, in which the rotor is seated overhung—that is without an upper neck bearing—on the shaft (cf. loc cit, page 167, FIG. 54 or page 169, FIG. 56). The thrust bearing is combined with the lower neck bearing, and installed in the lower bearing bracket. The bearing bracket is supported on the foundation.

Because, despite intensive cooling (by the lubricant), the thrust and guide bearing and the central region of the bearing support structure assume a substantially higher temperature than the peripheral parts of the bearing support structure, mechanical stresses arise which must be transferred to the foundation if the bearing support arrangement is rigid.

A possibility of keeping such loadings from the foundation consists in providing the bearing bracket with sloping arms or sloping spokes. In this way, preserving the centering and with only an insubstantial reduction in the radial stiffness, elongations of the central components are converted into a relative rotation between said components and the foundation (cf. German Patent 2,495,236 or U.S. Pat. No. 4,258,280). However, the solution using sloping spokes requires an expensive steel structure with a considerably greater axial height, and is only conditionally applicable to umbrella-type generators. Another known bearing support is shown in U.S. Pat. No. 4,048,528 (Whitney) which uses a box frame to support a thrust bearing of the rotor shaft. However, although the box frame is rigid, it cannot compensate for thermal elongations, and so provides undue stresses to both the foundation and the bearing.

SUMMARY OF THE INVENTION

Accordingly, one object of this invention is to provide a novel vertical-axis electrical machine of umbrella design, which has a bearing support structure of simple design, and in which the centering of the rotor with respect to the stator is maintained in all operating conditions.

This object is achieved according to the invention in that the bearing support structure is designed essentially as a hollow truncated cone, the lower end of the hollow truncated cone, which has the larger diameter, is supported directly on the foundation and anchored there, and the combined thrust and guide bearing is arranged at the other (upper) end of the hollow truncated cone.

Such an arrangement can be achieved in a simple fashion as a welded construction. In addition to the shaft leading to the hydroelectric machine, subunits, such as oil cooler and oil pump, are accommodated in the interior of the truncated cone.

The envelope of the truncated cone operates in the broadest sense as a sloping-spoke arrangement with axial sloping arms:

The mutual centering of rotor and stator is maintained when heating of the bearing and of the neighboring central parts of the support structure takes place. Thermally caused elongations are converted into an axial extension of the rotor and cone, whereas the radial stiffness is maintained. That is, the truncated cone transfers bearing loads to the foundation via its plane, but is able to distort axially in response to thermally caused elongations.

The rotor is advantageously designed as a plane disc which carries a rotating mass, for example in the form of rings or segmental laminations, at its periphery. The rotor poles are mounted in the usual way at these rotor rings. To stiffen the rotor in the axial direction, radial rib stiffeners are preferably provided, which have an axial height increasing outwards for larger core lengths. Their height—and thus their own stiffening effect—is limited only by the envelope of the truncated cone. Apart from the stiffening, they simultaneously serve rotor ventilation.

In this connection, the rotor is supported directly on the bearing. A hub in the usual sense no longer exists.

Instead of a disc-shaped rotor, the latter can also be designed in the form of a hollow truncated cone. The combination of a plane disc with a hollow truncated cone of this type is also possible.

A construction of this type without a hub makes it possible for the first time with a plane disc rotor to position the thrust and guide bearing, as seen axially, in the center of the core length or of the poles, so that the leverage between the point of application of force of the rotor mass and the guide bearing vanishes.

In addition to an essential simplification of the construction and of its computation, the invention makes possible a reduction of the design volume for the same specific output. The generating set and crane height are reduced, the entire powerhouse becomes lower. The foundations are simpler because of the even loading; no machine parts, or only very small ones have to be embedded in concrete. The largest transportation masses (rotor hub, central body of the thrust bearing) are reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, in which: an illustrative embodiment of the subject of the invention is represented in a partly strongly diagrammatic fashion; wherein.

DESCRIPTION OF THE PREFERRED EMBODIMENTS

Figure 1:
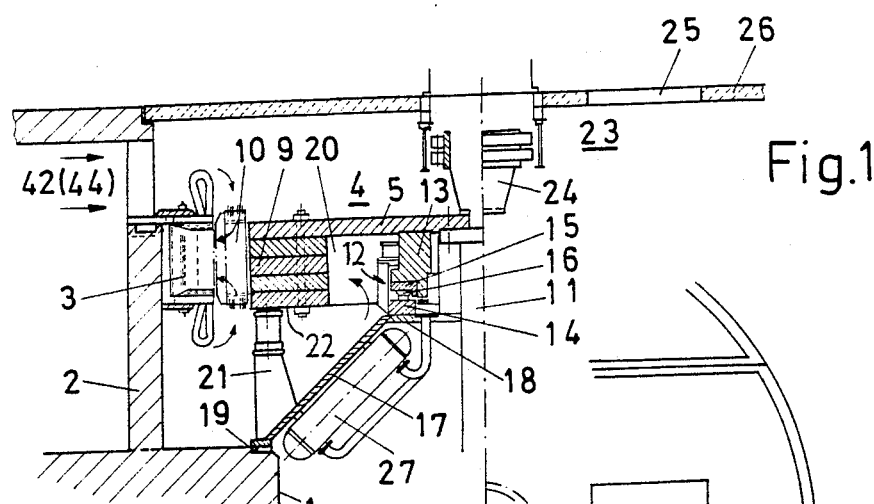
FIG. 1 shows a longitudinal section through an umbrella-type generator.

Referring now to the drawings, wherein like reference numerals designate identical or corresponding parts throughout the several views, the umbrella-type generator according to FIG. 1 is embedded in a foundation pit 1 having a circular cylindrical wall 2. Its stator 3 is supported at the wall 2 via supporting elements, the construction of which is explained later with referece to FIG. 3. The rotor 4 consists of a plane disc 5, which for larger rotor diameters can be welded together from several plates. A plurality of rings 9 or ring segments are mounted from below in the edge region of the disc 5. Together with the poles 10 arranged at the periphery of the disc 5 or rings 9, these form the rotating mass. The shaft leading to the hydroelectric machine is flanged on in the center of the disc 5.

The combined thrust and guide (i.e., journal) bearing, designated generally with the reference numeral 12, has a rotating bearing part 13, which is mounted directly at the disc 5 and lies coaxially with the shaft 11. The stationary bearing part 14 is mounted directly on a bearing support structure supported on the foundation 1. In the longitudinal direction of the machine, the thrust and guide segments 15 rest on supports 16. In the case of the example, the segments 15 have an L-shaped cross-section.

Preferably, a self-pumping hydrodynamic sliding bearing, such as is described, for example, in all its details in Swiss Patent 651,362 or in U.S. Pat. No. 4,573,810, is employed, or the condition that the thrust bearing segment and guide bearing segment are preferably constructed in one piece.

The bearing structure consists of a hollow truncated cone 17 having a cone envelope angle of between 30° and 60°, and is of appropriately prebent steel plates which are welded or screwed together on site. Welded on or in the upper end thereof is a cover ring 18, on which the stationary bearing agent 14 is mounted. At the other end, the truncated cone is mounted at the foundation 1 by means of foundation anchors 19.

In order to stiffen the rotor structure, a number of radial rib stiffeners 20 corresponding to the number of poles are mounted both at the disc 5 and also at the rings 9 or segments. In addition to stiffening the rotor, they serve, at the same time, to convey cooling air to the poles, radial cooling air slots or cooling air bores provided in the rings 9 or segments.

Also supported at the bearing support structure 17 is the stationary part 21 of the braking device, which cooperates with a brake ring 22 at the underside of the stack of rings 9.

For reasons of completeness, FIG. 1 also depicts the slip-ring apparatus 23 of the generator, the rotating part 24 of which can be flanged in a space-saving manner onto the upper side of the disc 5.

The foundation pit is covered by a cover plate 26 provided with an installation and servicing aperture 25.

The reduction in design height attainable through the invention is well in evidence in FIG. 1. The space available in the interior of the truncated cone 17 can even be used to accommodate additional units, especially the oil cooler 27 and, if necessary, oil pumps of the bearing.

Figure 2:
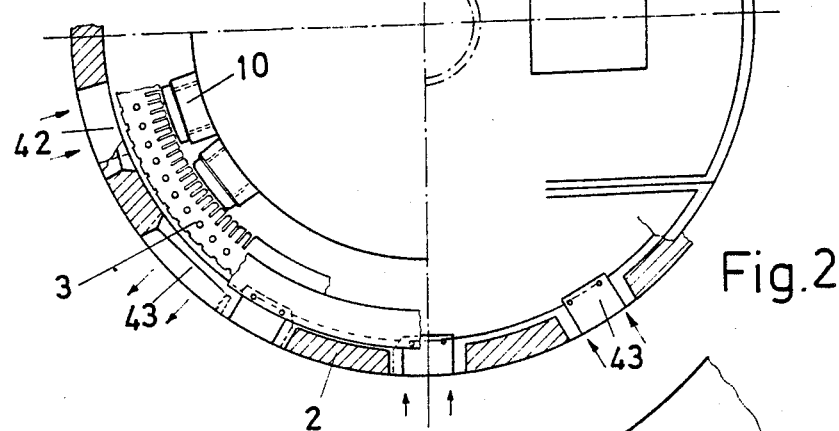
FIG. 2 shows a top view, partially in section, of the umbrella-type generator.

As may be seen from FIG. 2, the stator is arranged concentrically in the foundation pit 1. The stator laminated body 3 no longer has a frame in the usual sense, and is supported against the foundation wall 2 via sloping spokes 28. Support of this type is known per se, and is the subject of German Patent 2,459,237 or U.S. Pat. No. 4,060,744. To this end, there are provided at the laminated core periphery axially extending swallow-tail shaped grooves 29 in which strips 30 with a double swallow-tail shaped cross-section are inserted. Strips 32 with a double swallow-tail shaped cross-section are mounted at the wall 2 on plates 31 anchored in the wall 2. The sloping spokes 28 are connected in pairs via webs 33. Inwards and outwards radially, the webs 33 have swallow-tail shaped cutouts 34, which cooperate with the strips 30 and 32.

The strips 30 and 32 are inserted in form-fit fashion in each case into the grooves 29 or the cutouts 34. This process takes place after alignment of the stator 3 in the foundation pit 1, use being made of centering aids 35, which are replaced one after another by assemblies of pairs of sloping spokes.

Figure 3:
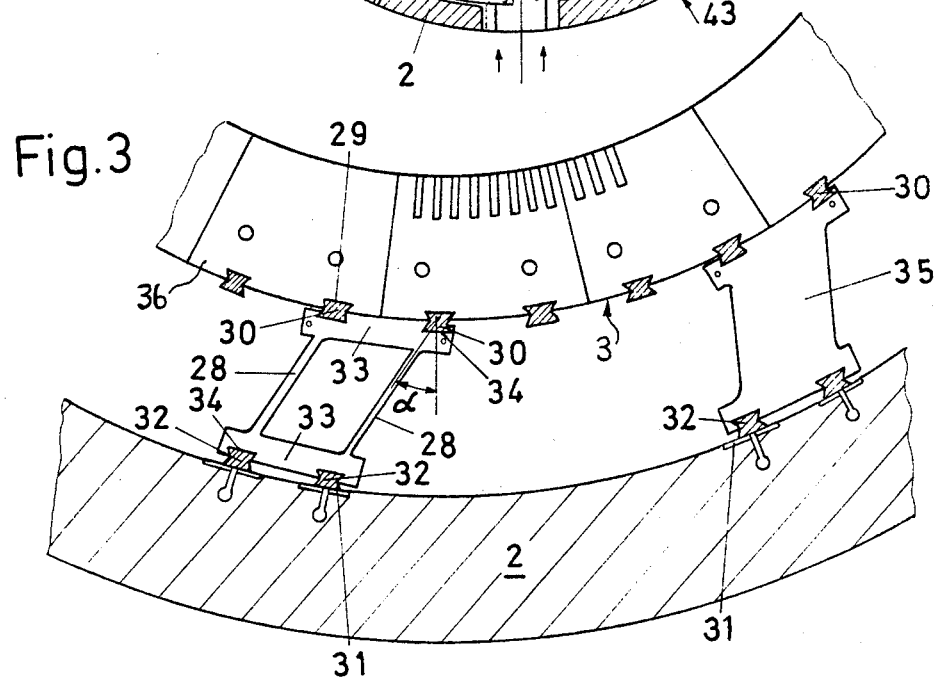
FIG. 3 shows an enlarged section of FIG. 2 from which may be seen the direct support of the stator at the wall of the foundation pit.

It may further be seen from FIG. 3 that the pairs of sloping spokes 28 or their inner webs 33 in each case comprise at least one joint for the laminated core constructed in layers from segmental laminations 36.

By means of the sloping spokes—the optimal angle $\alpha$ lies between 30° and 50°—elongations of the stator caused by temperature are converted into a relative rotation between stator 3 and foundation 1. Equally, the torque is transferred from the stator laminated core to the foundation by the sloping spokes.

Figure 4:
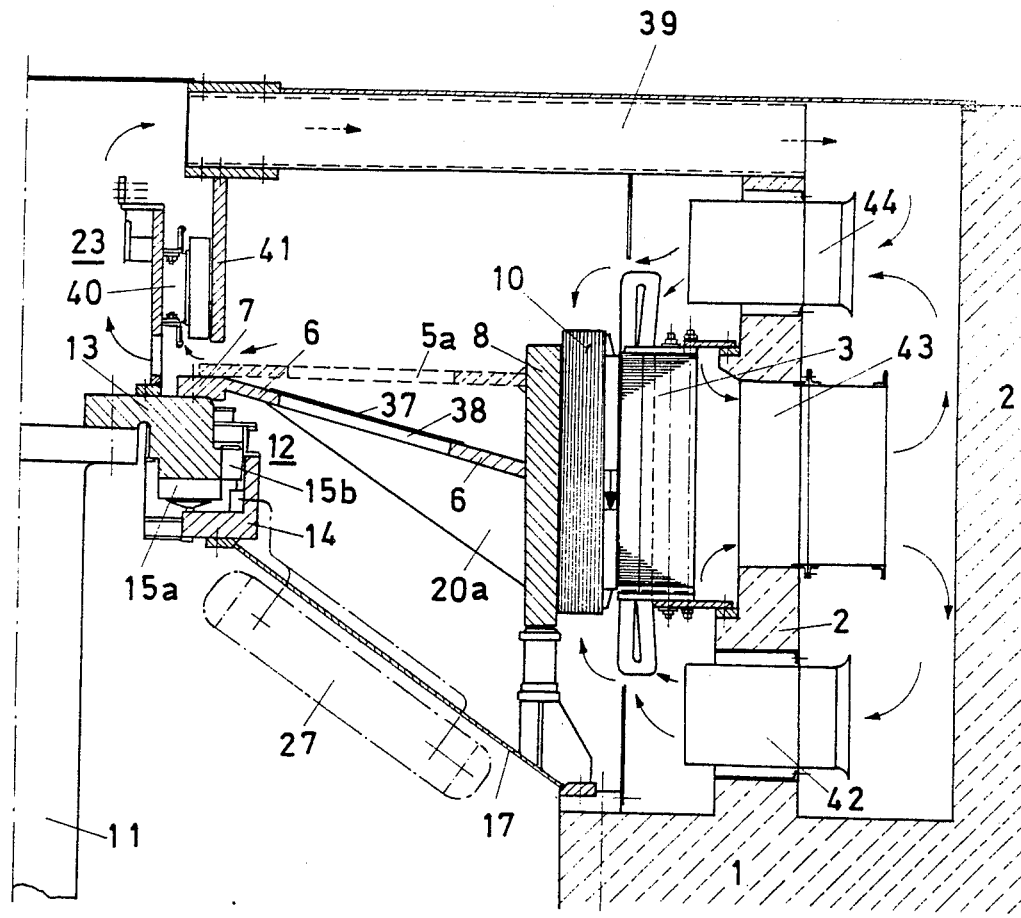
FIG. 4 shows an embodiment of an umbrella-type generator with a rotor in the form of a hollow truncated cone.

In the embodiment according to FIG. 4, the middle rotor part 6 is designed as a hollow truncated cone, which is welded in the hub region to a ring 7 mounted on the rotation bearing part 13. At the periphery the middle rotor part 6 is welded to an outer ring 8, which takes on the function of a rotating mass and of pole support device for the rotor poles 10. An opening 38 in the middle rotor part 6, which can be closed with a closure 37, enables access to the combined thrust and guide bearing 12, use being made here of separate thrust and guide segments 15a or 15, instead of L-shaped thrust and guide segments.

As in the first illustrative embodiment, here, too, the rotor 40 of the exciter is flanged onto the rotating bearing part 13. Cross-arms 39 serve to hang the stator 41 of the exciter. Here, too, radial rib stiffeners 20a can be provided, which are welded both to the middle rotor part 6 and also to the outer ring 8.

For the sake of completeness, FIGS. 1, 2 and 4 illustrate the ventilation of the rotor/stator. Provided in the wall 2 of the foundation 1 are openings 42, 43, 44, through which cooling air is alternately supplied and exhausted.

Finally, shown with dashes in FIG. 4 is the combination of a plane disc 5a with a middle rotor part shaped like a hollow truncated cone, which also follows the concept of the solution according to the invention.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A vertical axis electrical machine of unbrella design, comprising:
   a stator mounted stationary with respect to a foundation;
   a rotor rotatably mounted adjacent said stator;
   thrust and journal bearing means supporting said rotor for rotation with respect to said stator; and
   a bearing support structure comprising a truncated cone having an upper, smaller end supporting said thrust and journal bearing means, and a lower, larger end supported directly on the foundation, wherein said bearing support structure comprises means for supporting thrust and journal loads from said thrust and journal bearing means and for transferring said loads to the foundation via the plane of said truncated cone,
   whereby said rotor is rigidly radially supported while thermally caused dimensional variances in the length of the bearing support structure result in axial movements of said rotor.

2. A machine as claimed in claim 1, wherein the hollow truncated cone is assembled from sheets bent in the form of a conical envelope.

3. A machine as claimed in claim 1 or 2, wherein the rotor comprises a plane disc, at the outer region of which there is mounted from below a circular rotating mass, wherein rotor poles are arranged at the periphery of the disc and the rotating mass.

4. A machine as claimed in claim 1 or 2, wherein the rotor has a middle part in the form of a hollow truncated cone, and the lower, radially outer end of said middle part is connected to an outer ring, and the other end is connected to the bearing means.

5. A machine as claimed in claim 1 or 2, wherein the rotor comprises a plane disc having a middle part in the form of a hollow truncated cone lying thereunder, at the outer periphery of which an outer ring is mounted.

6. A machine as claimed in claim 3, wherein the bearing means, seen axially, is arranged approximately in the middle of the rotor poles.

7. A machine as claimed in claim 3, wherein the rotor is reinforced by radially extending rib stiffeners which are mounted both at the underside of the disc and at the inner side of the rotating mass.

8. A machine as claimed in claim 1 or 2, wherein the bearing means comprise a self-pumping combined thrust and journal bearing.

9. A machine as claimed in claim 8, including portions of the bearing means arranged inside the bearing support structure.

10. A machine as claimed in claim 1 or 2, including a shaft of the machine and the rotating bearing part of the bearing means flanged on at the underside of the rotor.

11. A machine as claimed in claim 1 or 2, wherein the stator is supported at the foundation via sloping spokes without the interposition of a stator frame.

* * * * *